United States Patent
Yau et al.

(10) Patent No.: US 7,236,617 B1
(45) Date of Patent: Jun. 26, 2007

(54) METHOD AND DEVICE FOR DETERMINING A TOTAL MINUTIAE TEMPLATE FROM A PLURALITY OF PARTIAL MINUTIAE TEMPLATES

(75) Inventors: Wei Yun Yau, Singapore (SG); Kar Ann Toh, Singapore (SG); Xudong Jiang, Singapore (SG)

(73) Assignees: Nanyang Technological University, Singapore (SG); Agency for Science, Technology and Research, Singapore (SG)

( * ) Notice: Subject to any disclaimer, the term of this patent is extended or adjusted under 35 U.S.C. 154(b) by 0 days.

(21) Appl. No.: 10/257,283

(22) PCT Filed: Apr. 13, 2000

(86) PCT No.: PCT/SG00/00048
§ 371 (c)(1),
(2), (4) Date: Nov. 7, 2002

(87) PCT Pub. No.: WO01/80167
PCT Pub. Date: Oct. 25, 2001

(51) Int. Cl.
*G06K 9/00* (2006.01)
(52) U.S. Cl. .................................................. 382/125
(58) Field of Classification Search ................ 382/125
See application file for complete search history.

(56) References Cited

U.S. PATENT DOCUMENTS

| | | |
|---|---|---|
| 4,135,147 A | 1/1979 | Riganati et al. |
| 4,646,352 A | 2/1987 | Asai et al. |
| 5,493,621 A | 2/1996 | Matsumura |
| 5,524,161 A | 6/1996 | Omori et al. |

(Continued)

FOREIGN PATENT DOCUMENTS

WO   WO 99/59099   11/1999

OTHER PUBLICATIONS

Xudong Jiang, Wei-Yun and Wee Ser, Two-stage local and global fingerprint matching technique for automated fingerprint verification/identification, Singapore Patent Application No. 9903290-6, which was granted in Singapore with Grant No. 0067584.

(Continued)

*Primary Examiner*—Bhavesh Mehta
*Assistant Examiner*—Damon Conover
(74) *Attorney, Agent, or Firm*—Davidson Berquist Jackson & Gowdey, LLP (57) ABSTRACT

A reference minutiae template comprising reference minutiae and a first partial minutiae template, which overlaps the reference minutiae template, the first partial minutiae template comprising first minutiae, are selected. The reference minutiae of the reference minutiae template are matched with the first minutiae of the first partial minutiae template. Using the matched minutiae, a transformation function is determined, which describes the relation between the reference minutiae and the first minutiae. The first minutiae, which are located outside the overlapping region, are transformed using the transformation function, thereby generating a new reference template. Furthermore, a second partial minutiae template is selected, which overlaps the new reference minutiae template, the second partial minutiae template comprising second minutiae. The method is repeated iteratively for all partial minutiae templates with the new reference minutiae template as the reference minutiae template of the next iteration, the second partial minutiae template as the first partial minutiae template of the next iteration, thereby generating the total minutiae template.

16 Claims, 5 Drawing Sheets

U.S. PATENT DOCUMENTS

| | | | |
|---|---|---|---|
| 5,537,484 A * | 7/1996 | Kobayashi | 382/124 |
| 5,727,093 A * | 3/1998 | Uchiyama et al. | 382/294 |
| 5,960,101 A | 9/1999 | Lo et al. | |
| 6,041,133 A * | 3/2000 | Califano et al. | 382/124 |
| 6,289,114 B1 * | 9/2001 | Mainguet | 382/124 |
| 6,314,197 B1 * | 11/2001 | Jain et al. | 382/125 |
| 6,546,122 B1 * | 4/2003 | Russo | 382/125 |
| 6,597,802 B1 * | 7/2003 | Bolle et al. | 382/124 |
| 6,661,913 B1 * | 12/2003 | Zhang et al. | 382/154 |

OTHER PUBLICATIONS

Xudong Jiang et al., "Minutiae Extraction by Adaptive Tracing the Gray Level Ridge of the Fingerprint Image", International Conference on Image Processing, Oct. 1999.

Maio and Maltoni, Direct Gray-Scale Minutiae Detection in Fingerprints, IEEE Transactions on Pattern Analysis and Machine Intelligence, vol. 19, No. 1, pp. 27-39, Jan. 1997.

* cited by examiner

METHOD AND DEVICE FOR DETERMINING A TOTAL MINUTIAE TEMPLATE FROM A PLURALITY OF PARTIAL MINUTIAE TEMPLATES

BACKGROUND OF THE INVENTION

The invention relates to a method and a device for computer-based determination of a total fingerprint template from a plurality of partial fingerprint templates and a computer readable medium.

In order to provide an identification mechanism based on biometric characteristics of a person which is to be identified. One biometric characteristic often used for personal verification/identification is the person's fingerprint.

In this kind of verification/identification, typically the person's fingerprint is detected by a fingerprint sensor, thereby generating a fingerprint image.

The word "fingerprint" is herein used as a representative of a fingerprint or a like pattern or figure. More particularly, the fingerprint may be an actual finger, a palm print, a toe print, a soleprint, a squamous pattern, and a streaked pattern composed of streaks. The fingerprint may also be a diagram drawn by a skilled person to represent a faint fingerprint remain which is, for example, left at the scene of a crime.

Usually, the person, who would like to use a device for this kind of verification/identification is required to register his or her fingerprint in a registration step for later verification/identification in a verification/identification step.

During the registration, characteristic features of the fingerprint will be extracted and stored in a storage media of the device. Such a fingerprint image is called the template fingerprint and such a stored characteristic features are called the template minutiae.

When a person wants to use the device, he has to present his fingerprint to the device.

The unknown fingerprint of the person who wants to be identified in a verification/identification step is usually detected by a fingerprint sensor. The characteristic features of the detected fingerprint will be extracted and matched against the template minutae of the template fingerprint. If a match is found, the person is identified as the person the respective pre-stored template fingerprint refers to. Otherwise, the person is identified as an unauthorized user and the further use of the device will be prohibited.

The template minutiae usually comprise geometrical and other useful characteristic information (or features) pertaining to the local discontinuities (the minutiae) of the fingerprint, such as

- the type of the current minutiae,
- the location of the current minutiae,
- the direction of the current minutiae,
- the ridge count between the current minutiae and its neighboring minutiae,
- the location of the neighboring minutiae,
- the distance relationship of the current minutiae with respect to its neighboring minutiae, and/or
- the angular relationship of the current minutiae with respect to its neighboring minutiae.

In [1] and [2], methods to determine the template minutiae are described. The basic concept of these both methods is to determine all the minutiae present in the fingerprint image.

From these determined minutiae, the required parameters are subsequently determined.

Furthermore, methods to match the fingerprints or to compare whether two fingerprints are similar to each other or not using the fingerprint templates, are described in [3], [4], [5], or [6].

In the Singapore patent application [6], a two-stage local and global fingerprint matching technique for automated fingerprint identification is described, which disclosure is herewith entirely incorporated by reference.

Known optical fingerprint sensors usually have an imaging area of about 25.4 mm by 25.4 mm, which is usually sufficient to cover the entire surface of the finger when the finger is pressed on the imaging area of the optical fingerprint sensor. However, a typical solid-state fingerprint sensor, such as the FPS 110 sensor from Veridicom, Inc. or the FingerTip™ sensor from Infineon, Inc. has a smaller sensor area in order to ensure that the cost of the sensor is acceptably low. For example, the FPS 110 has a sensor area of 15 mm by 15 mm and the FingerTip™ sensor has a sensor area of 11.1 mm by 14.3 mm. Thus, with such a small sensor area, it is usually not possible to detect the entire fingerprint with one detection iteration, i.e. with one fingerprint image, since the sensor area is not sufficient to cover the entire surface of the finger when the finger is pressed on the sensor area of the solid-state fingerprint sensor.

This situation creates several problems such as:
- How to detect and represent the entire fingerprint image (total fingerprint image) using the small sensor area?
- How to make the fingerprint template determined from a detected fingerprint image using a small sensor area to be compatible to that detected by a fingerprint sensor with a larger sensor area?
- How to make the fingerprint template determined from the various fingerprint images with various sizes to be compatible for fingerprint matching.

A method to solve the above mentioned problems would be to enroll multiple fingerprints detected from the same finger but at different locations. However, this would mean that more storage space would be required to store the plurality of templates. Furthermore, the time required to do the search will become longer as the number of templates, which have to be taken into account, increases.

Furthermore, in [7], a method for manual edition or correction of a fingerprint minutiae from a displayed fingerprint image is described. The proposed method only deals with one fingerprint. With this method, there is no combination of minutiae, which are obtained from a plurality of fingerprint images, possible.

Furthermore, the least square approach to estimate an inverse of a matrix is described in [8].

SUMMARY OF THE INVENTION

Thus, it is an object of the invention, to overcome at least one of the above mentioned shortcomings.

This object is achieved with a method, a device for computer-based determination of a total minutiae template of a total fingerprint from a plurality of partial minutiae templates of partial fingerprints and a computer readable medium with the features according to the independent claims.

In a method for computer-based determination of a total minutiae template of a total fingerprint from a plurality of partial minutiae templates of partial fingerprints, a reference minutiae template comprising reference minutiae obtained from the reference fingerprint image, is selected from the plurality of partial minutiae templates. Furthermore, a first partial minutiae template derived from a first fingerprint image which overlaps the reference fingerprint image, is selected. The first partial minutiae template has first minutiae.

In the beginning, a plurality of partial images of a fingerprint may be detected by a fingertip sensor, e.g. by the FPS 110 or the FingerTip™ sensor. The partial fingerprint images may be acquired successively from the respective person, who wants to be registered by acquiring images of the finger at several different locations with reference to the sensor area. Subsequently, a partial minutiae template for each partial fingerprint image may be determined. In addition, a mathematical description of the boundary of the effective fingerprint region for each partial fingerprint image may be determined.

After the selections have taken place, the reference minutiae of the reference minutiae template are matched with the first minutiae of the first partial minutiae template.

Matching in this context means, that there is determined the similarity of a reference minutiae and a respective first minutiae. The similar or matched minutiae can be assumed to be located in the overlapping region of the reference fingerprint image and the first partial fingerprint image.

Using the matching result, a transformation function is determined. The transformation function describes the relation between the reference minutiae and the first minutiae. With the transformation function, all the minutiae of the first partial minutiae template which are in the coordinate space of the first partial fingerprint image can be transformed to the coordinate space of the reference partial fingerprint image, so as to incorporate them into the reference minutiae template.

The transformation function may be determined according to the following steps:

Using the matching results, a predetermined number of reference minutiae and first minutiae, respectively, are selected. Those minutiae are selected, which comply e.g. best with a predefined criterion according to the matching result.

This criterion may simply be, that those minutiae are selected, that match within an allowable predefined tolerance. The reference minutiae or the first minutiae may be selected by sorting the minutiae in respective descending order with respect to the matching criterion (largest match score first) and then selecting the predetermined number first, i.e. the best, reference minutiae and first minutiae with the highest match value. If the number of available matched minutiae in the overlapping region is less than the predetermined number, then all matched minutiae may be used.

At least three reference minutiae and three first minutiae may be selected according to the preferred embodiment of the invention.

Using the selected reference minutiae according to the descending order, a reference matrix A may be formed. Accordingly, using the selected first minutiae, a first matrix B may be formed. The reference matrix A and the first matrix B may be related with each other by the following formula:

$$A = f(B), \quad (1)$$

Wherein f( ) is a transformation function relating matrix A and matrix B. The transformation function can be linear or non-linear.

In the case of linear transformation, a suggested transformation function is given by the following formula:

$$A = T \cdot B, \quad (2)$$

wherein T is the linear transformation matrix.

Based on the matrices A and B, the transformation function f( ) as in Equation (1) can be solved.

In the case of linear transformation as in Equation (2), the transformation matrix T may be determined from the transformation relation between the reference matrix A and the first matrix B, e.g. by matrix inversion.

In the case of matrix inversion with only three matched minutiae being selected, the transformation matrix T is determined according to the following formula:

$$T = A \cdot B^{-1}, \quad (3)$$

wherein $B^{-1}$ is the inverse of the first matrix B.

Alternatively, if more than three minutiae are selected, the least square approach may be used to estimate the transformation matrix T, which is described in [8].

Similarly as described in [8], the matrix T can be solved with constraints such that the matrix can be resolved into a rotation matrix, R, and a translation vector, d. The rotation matrix R and the translation vector d will then describe the amount of rotation and translation respectively, between the reference fingerprint image and the first partial fingerprint image.

Subsequently, the overlapping region can be determined using the transformation function found and the boundary of the effective reference fingerprint image and the first partial fingerprint image. In determining the overlapping region, it will suffice that for any minutia in the first partial minutiae template, it can be determined whether the minutia is located within the overlapping region of the reference fingerprint and the first partial fingerprint, or outside of the overlapping region.

The coordinates of the first minutiae, which are located outside the overlapping region, are transformed using the transformation matrix into the coordinate space of the reference minutiae template, thereby generating a new reference template, which comprises the reference minutia and the transformed first minutiae. The first minutiae, which are matched with the reference minutiae may be discarded. Similarly, any first minutia, which is located within the overlapping region, but which could not be matched with a reference minutia in accordance with the predetermined tolerance, may be discarded.

In a further step, a second partial minutiae template is selected, which has an overlapping region with the new reference minutiae template. The second partial minutiae template comprises second minutiae.

The above mentioned steps are repeated iteratively for all partial minutiae templates of the plurality of partial minutiae templates with the new reference minutiae template as the reference minutiae template of the next iteration, the second partial minutiae template as the first partial minutiae template of the next iteration, thereby generating the total minutiae template.

It should be mentioned, that it is also possible, to acquire all partial fingerprint images at a remote site e.g. when registering a person to allow the use of a fingerprint device to access a system, e.g. a closed area such as a closed room. Then, the remote site may compute all the partial minutiae templates of the partial images and then send these partial minutiae templates over to a central site, provided e.g. with a server computer, to do the described synthesis. In such a case, the server computer would start the method with the matching of the reference minutiae with the first minutiae in the overlapping region.

Furthermore, a central partial minutiae template of the fingerprint may be selected as the reference minutiae template of the first iteration.

In a preferred embodiment of the invention, at least one further parameter of the first minutiae that is not rotation and translation invariant, for example the orientation of the first minutiae, is transformed using, for example, the rotation and translation information recovered from the transformation matrix.

A computer-based device for determination of a total fingerprint template from a plurality of partial fingerprint templates of partial fingerprints, comprises a computer, which is arranged to execute the predescribed steps.

A computer readable medium has a program recorded thereon, where the program makes the computer execute the above-described procedure comprising the described steps for determination of a total fingerprint template from a plurality of partial fingerprint templates of partial fingerprints.

DESCRIPTION OF THE PREFERRED EMBODIMENTS

A preferred embodiment of this invention and modifications thereof will now be described with reference to the accompanying drawings.

Figure 1:
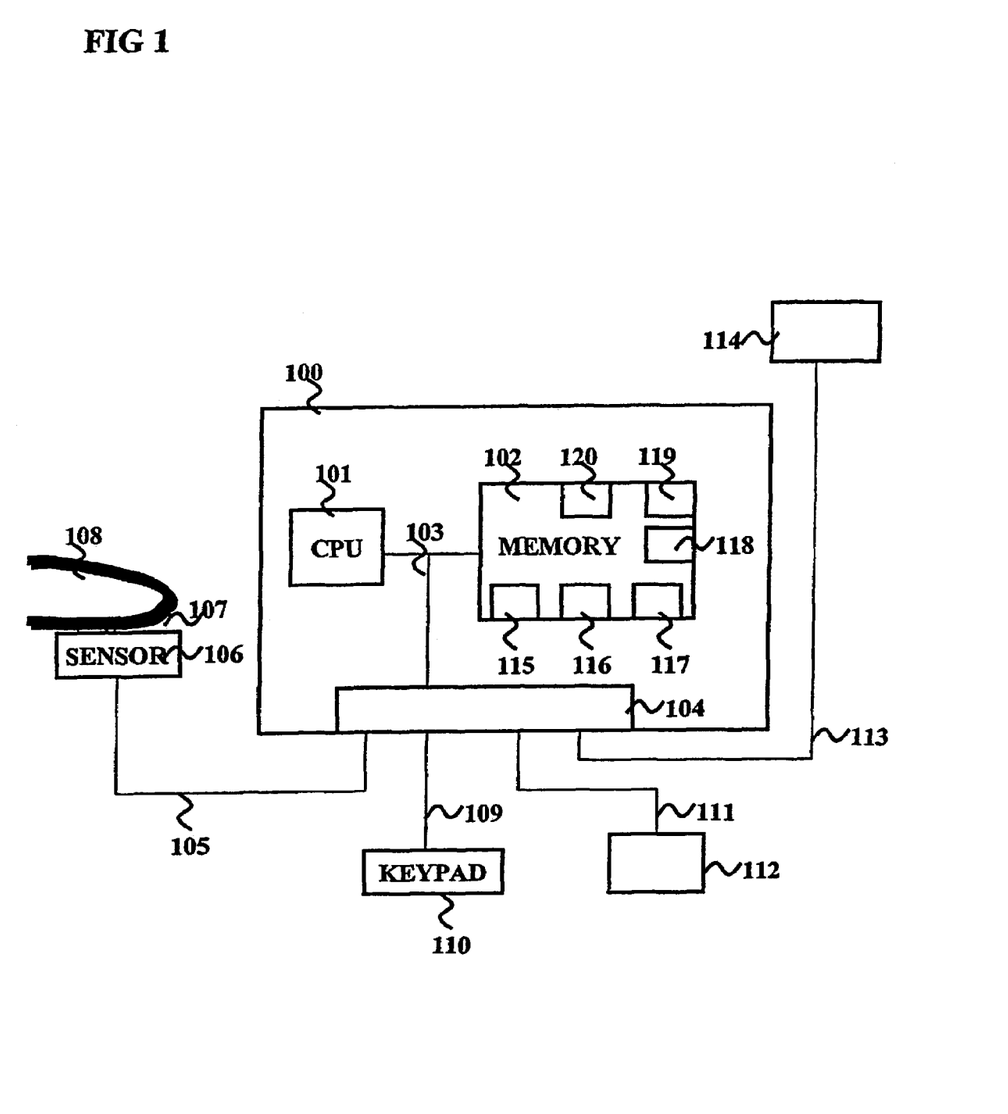
FIG. 1 is a block diagram of a computer which is used to perform the steps of the method according to a preferred embodiment of the invention.

FIG. 1 shows a computer 100 comprising
a central processing unit (CPU) 101,
a storage device 102,
a computer bus 103, and
an input-/output-interface 104.

The central processing unit 101, the storage device 102 and the input-/output-interface 104 are coupled with the computer bus 103 for exchanging electrical signals.

Via the input-/output-interface 104 and a first connection 105, the computer 100 is coupled with a fingertip sensor 106, according to this embodiment the FingerTip™ sensor of Infineon, Inc., with which partial fingertip images of a fingertip 107 are taken from a finger 108. Furthermore, via the input-/output-interface 104 and a second connection 109, the computer 100 is coupled with a keyboard 110, and via a third connection 111, the computer 100 is coupled with a computer mouse 112. Via the input-/output-interface 104 and a fourth connection 113, the computer 100 is coupled with a display 114.

After the fingertip sensor 106 has taken the partial fingerprint images, the fingertip images 115 are sent from the fingertip sensor 107 to the computer 100, where they are stored in the storage device 102. In the storage device 102, there is further stored a computer program 117, which makes the computer 100 execute a method comprising the steps, which will further be described in detail.

For further explanation, it is assumed, that each partial image comprises minutiae of the finger 108, which are extracted from the images 115.

For each of the minutiae, a minutiae feature vector $FG_k$ 116 ($k=1, \ldots, n$) is determined and stored in the storage device 102. The minutiae feature vector $FG_k$ 116 comprises the following features:

$$FG_k = \begin{pmatrix} x_k \\ y_k \\ \rho_k \\ m_k \end{pmatrix}, \quad (4)$$

wherein
$x_k$ is a first coordinate of the minutiae k in a given right-hand orthogonal coordinate space,
$y_k$ is a second coordinate of the minutiae k in the coordinate space,
$\rho_k$ is a direction ($-\pi < \rho_k \leq \pi$), which is defined as a local ridge direction of an associated ridge of the minutiae k,
$m_k$ is a minutiae type of minutiae k out of a given amount of minutiae types.

The first coordinate $x_k$, the second coordinate $y_k$, and the direction $\rho_k$ are dependent on the position and orientation of the finger 108 on the fingertip sensor 106, when the fingertip 107 is acquired. These features, i.e. characteristics, are not rotation and translation invariant.

Figure 2:
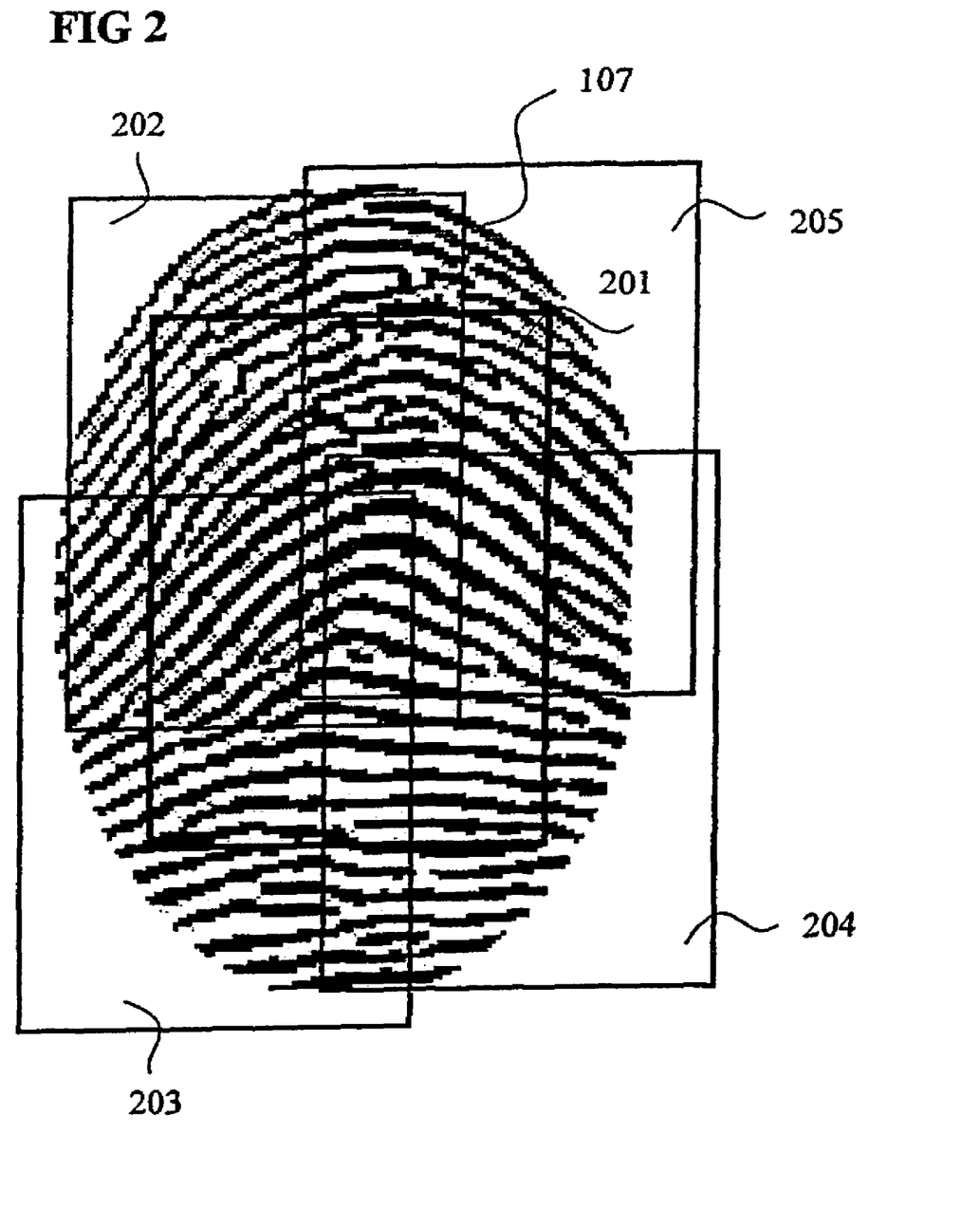
FIG. 2 is an image of a fingerprint, showing a plurality of partial images.

FIG. 2 shows the fingertip 107 and five partial fingertip images 201, 202, 203, 204, 205 of the fingertip 107, which are acquired using the fingertip sensor 106, since it is not possible to acquire the entire fingertip image, at once.

The five partial fingertip images 201, 202, 203, 204, 205 altogether cover the entire fingertip 107 and thus, all minutiae of the fingertip 107 are detected, though they are not yet present in one total image of the fingertip 107.

Figure 4:
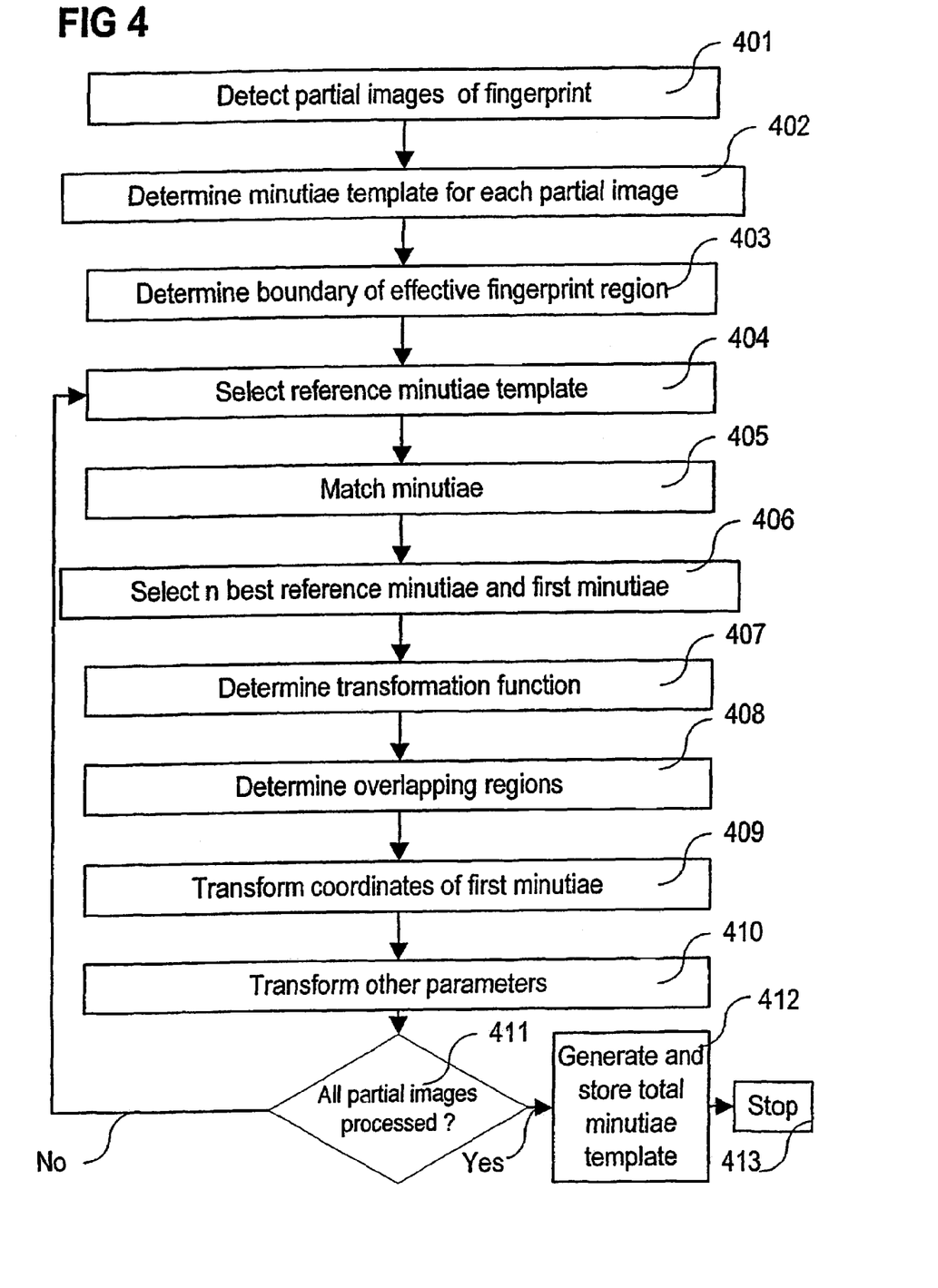
FIG. 4 is a flow diagram showing the steps of the method according to a preferred embodiment of the invention.

Thus, in a first step (step 401) of the method according to the preferred embodiment of the invention, the partial images 201, 202, 203, 204, 205 of the fingertip 107 are detected in a way, that the partial images altogether cover the entire fingertip 107 (see FIG. 4).

In a further step (step 402), for each partial image, the respective minutiae template is determined. For determination of the minutiae templates, the method described in [1] is used.

Figure 5A:
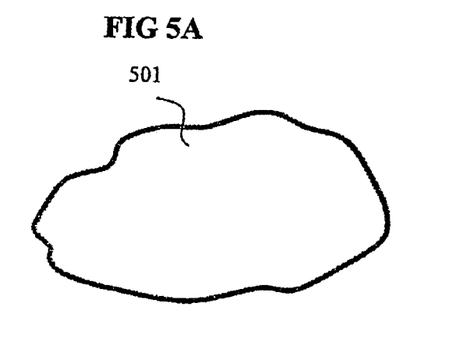
FIGS. 5a to 5e are drawings showing the process to combine minutiae templates of two partial images according to a preferred embodiment of the invention.
Figure 5B:
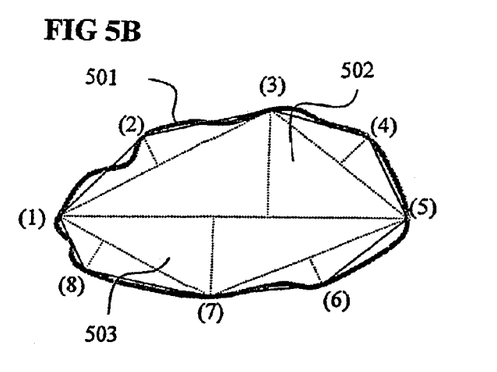

Subsequently, the boundary of an effective fingerprint region is determined (step 403) and the minutiae are matched according to the following steps, as shown in FIG. 5a to FIG. 5e:

FIG. 5a shows a boundary 501 of a segmented fingerprint. Two farthest points in the boundary 501 are found as shown as points (1) and (5) in FIG. 5b. The point marked (3) has the longest perpendicular distance from the top boundary to line (1)–(5), i.e. in an upper segment 502. Similarly, point (7) has the longest distance in the bottom segment 503. Using the same method. Points (2), (4), (6) and (8) can be found as shown in FIG. 5b. Thus, the fingerprint boundary 501 is approximated by eight points. The fingerprint boundary 501 can be described mathematically. If better accuracy is required, more points can be used to describe the boundary using the same method described.

Figure 5C:
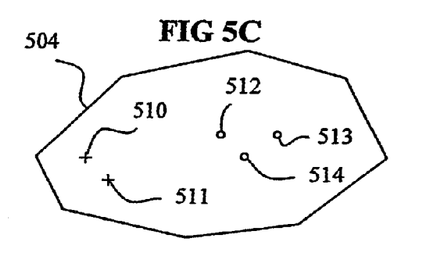
Figure 5D:
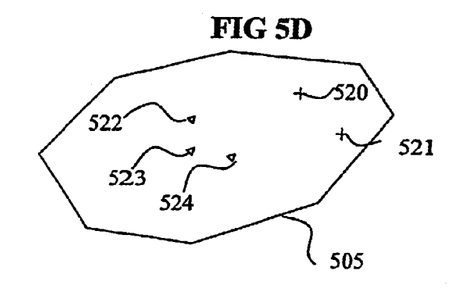

Now, the way to find the correspondence between two fingerprints will be described in detail:

Two partial fingerprint images 504, 505 of a same finger 108 and their determined minutiae 510, 511, 512, 513, 514 of the reference partial fingerprint image 504 and 520, 521, 522, 523, 524 of the first partial fingerprint image 505 are shown in FIG. 5c (reference partial fingerprint image 504) and in FIG. 5d (first partial fingerprint image 505).

The minutiae 510, 511, 512, 513, 514 of the reference partial fingerprint image 504 and the minutiae 520, 521, 522, 523, 524 of the first partial fingerprint image 505 have different coordinate spaces.

By using the minutiae matching algorithm described in [6], the minutia structure as shown as the circles 512, 513, 514 in FIG. 5c and the minutia structure as shown as the triangles 522, 523, 524 in FIG. 5d are matched.

Alternatively, any of the methods described in [3], [4], or [5] may be used for matching the minutiae.

Thus, the respective minutiae that are located inside the overlapping regions are determined for each pair of the partial minutiae template from the partial fingerprint image which overlap with each other. These two determined minutia structures are then used as the reference minutiae to align these two partial fingerprint images.

In a further step (step 404), the reference minutiae template 201, 300 comprising reference minutiae from the plurality of partial minutiae templates is selected. Preferably, a partial minutiae template is selected as the reference minutiae template 201, which represents a partial image, which includes a partial image substantially of the center of the fingerprint 107, as shown in FIG. 2.

However, it should be mentioned that it is not important that the central partial image, the partial minutiae template is determined from, has to be exactly at the center of the fingerprint 107. It will suffice that the partial image covers the most of the central area of the fingerprint 107 without any failure to the embodiment of the invention.

Furthermore, according to the present embodiment of the invention, it is assumed that the reference partial image, the partial minutiae template is determined from, is the first partial image acquired in step 401. However, the order is not important at all and the method according to the present embodiment of the invention will work well even if the central partial image is not the first partial image acquired.

Figure 3:
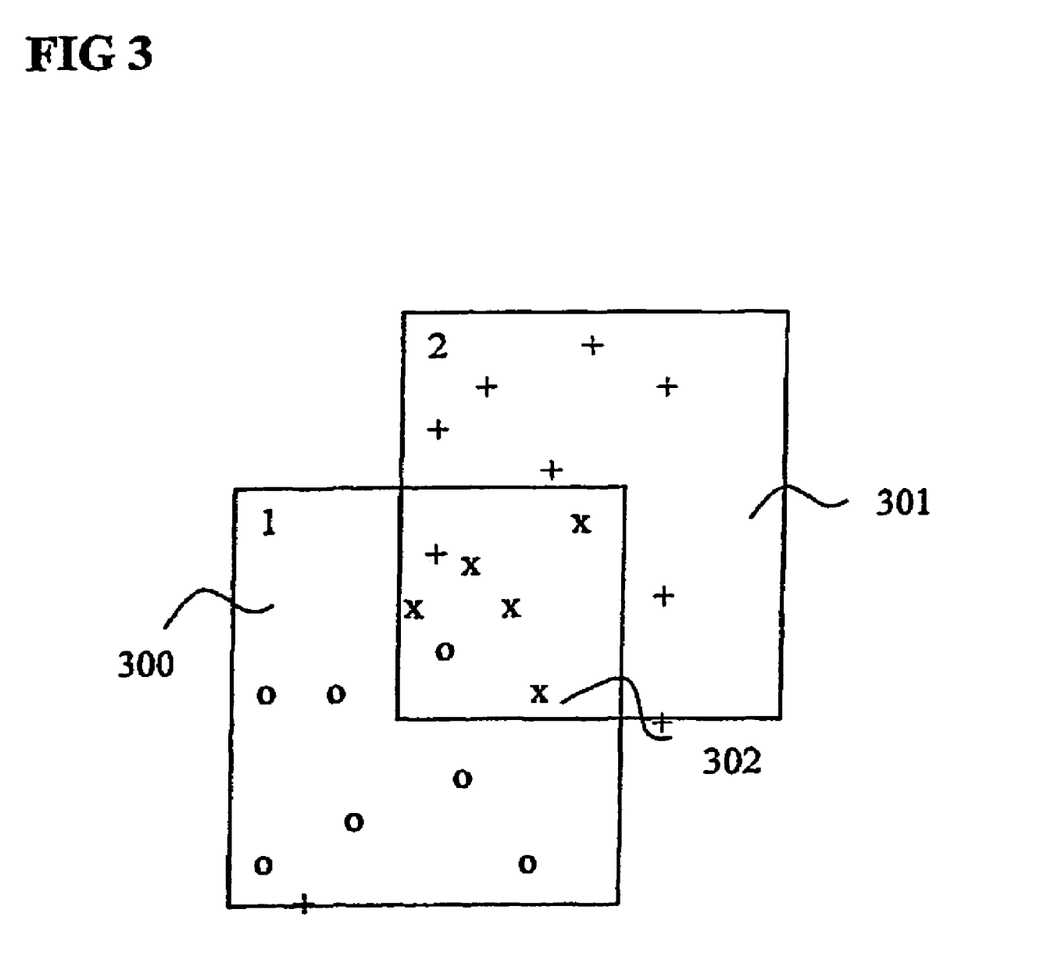
FIG. 3 shows matched minutiae in an overlapping region of two minutiae templates according to a preferred embodiment of the invention. The minutiae in the overlapping region are designated with the symbol "x".

FIG. 3 shows the reference minutiae template 300 and a further selected first partial minutiae template 301, which overlaps the reference minutiae template 300 in an overlapping region 302. The first partial minutiae template 301 comprises first minutiae, are designated with the symbol "o" in FIG. 3. The reference minutiae in the reference minutiae template 300 are designated with the symbol "+", while the matched minutiae (i.e. the minutiae found in both the reference and the first partial minutiae template) are designated with the symbol "x".

In a further step, the first minutiae of the first partial minutiae template are matched with the reference minutiae of the reference minutiae template (step 405). In the preferred embodiment, the matching method used is that described in [6]. However, the methods described in [3], [4], or [5] may be used alternatively for matching the first minutiae of the first partial minutiae template with the reference minutiae of the reference minutiae template.

After the matching has been finished, n reference minutia and n first minutia (according to the preferred embodiment of the invention, n=10), that matches within an allowable tolerance, are determined (step 406).

For example, according to the preferred embodiment of the invention, the degree described in [6] is respectively determined and used as criterion.

Alternatively, any metric may be used, which gives information about the similarity of the matched minutiae.

The matched minutiae are listed according to a descending order (largest match score first) and the first n minutiae with the highest match are selected, respectively. If the number of available matched minutiae is less than n, then all matched minutiae may be used. However, a minimum of n=3 is suggested.

From the matched minutia found, a transformation function f( ) that relates the first minutiae template of the first partial fingerprint image to the reference minutiae template of the reference partial fingerprint image using the formula, is determined (step 407):

$$A = f(B), \qquad (5)$$

wherein
A is a reference matrix formed by the selected reference minutiae,
f( ) is the transformation function, which can be a linear transformation function or a non-linear transformation function,
B is a first matrix formed by the selected first minutiae.

According to the preferred embodiment of the invention, a linear transformation function is suggested as follows:

$$A = T \cdot B, \qquad (6)$$

The reference matrix A is formed using at least the column vectors of $x_k$, $y_k$ coordinates of the respective reference minutia obtained in the reference partial image.

Similarly, the first matrix B is formed using at least the column vectors of $x_k$, $y_k$ coordinates of the respective first minutia obtained from the first partial image.

According to the preferred embodiment of the invention as given by Equation (6), matrix B is formed with an additional row vector of 1. Then the transformation matrix T is the linear transformation matrix relating the reference matrix A and the first matrix B.

The reference matrix A is preferably of the form:

$$A = \begin{bmatrix} x_{1r} & x_{2r} & \cdots & x_{nr} \\ y_{1r} & y_{2r} & \cdots & y_{nr} \end{bmatrix}, \qquad (7)$$

wherein r denotes the reference minutiae template.

The first matrix B is preferably of the form:

$$B = \begin{bmatrix} x_{1i} & x_{2i} & \cdots & x_{ni} \\ y_{1i} & y_{2i} & \cdots & y_{ni} \\ 1 & 1 & \cdots & 1 \end{bmatrix}, \qquad (8)$$

wherein i denotes the current partial minutiae template.

If n=3, the transformation matrix T is determined according to the following formula (step 407):

$$T = A \cdot B^{-1}, \qquad (9)$$

wherein $B^{-1}$ is the inverse matrix of the first matrix B.

As described in [8], the matrix T can be solved with the constraints such that the matrix can be resolved into a rotation matrix, R, and a translation vector, d. The rotation matrix R and the translation vector d will then describe the amount of rotation and translation respectively, between the reference fingerprint image and the first partial fingerprint image.

The rotation matrix R and translation vector d can also be found separately in the preferred embodiment of the invention.

From the minutiae feature vector as given by Equation (4), the average rotation angle, ρ, can be found from the matched minutiae as follows:

$$\rho = \frac{1}{n}\sum_{k=1}^{n}(\rho_{kr} - \rho_{ki}) \quad (10)$$

wherein r is the minutia in the reference minutiae template and i is the minutia in the current partial minutiae template.

R can then be written as follows:

$$R = \begin{bmatrix} \cos(\rho) & -\sin(\rho) \\ \sin(\rho) & \cos(\rho) \end{bmatrix} \quad (11)$$

and d can be written as follows:

$$d = [d_x, d_y]^T \quad (12)$$

with $$d_x = x_{1r} - x_{1i}$$

$$d_y = y_{1r} - y_{1i} \quad (13)$$

wherein $(x_{1r}, y_{1r})$ are the reference coordinates of the reference minutiae template and $(x_{1i}, y_{1i})$ the reference coordinates of the first partial minutiae template for the transformation.

It should be mentioned, that it is also possible, to obtain the transformation matrix T even for n=1 or n=2 using the Equation (10) to Equation (13) as described above.

Alternatively, if more than three minutiae are selected, the least square approach may be used to estimate the transformation matrix T, which is described in [8].

Subsequently, the overlapping regions of the partial images are determined (step 408).

Using the transformation function found, the points used to describe the boundary of the effective first partial fingerprint image can be transformed to the coordinate space of the reference partial fingerprint image. Together with the points describing the boundary of the effective reference partial fingerprint image, the overlapping region can be found.

Alternatively, using the transformation function, the coordinates $x_k$, $y_k$ of the first partial minutiae template can be transformed into the reference minutiae template. Together with the boundary of the effective reference fingerprint image, it can be determined whether the transformed minutiae is located inside the reference minutiae template or outside of it. Those that are located inside the reference minutiae template are considered as located inside the overlapping region.

The coordinates $x_k$, $y_k$ of those minutiae in first minutiae template 301 that are not in the reference minutiae template 300 and are located outside of the overlapping region 302, are transformed onto the reference minutiae template 300, i.e. into the coordinate space of the reference minutiae template 300 using equation (1) (step 409).

The other parameters of the respective first minutiae that are not rotation and translation invariant are transformed as well into the coordinate space of the reference minutiae template 300 (step 410).

In the preferred embodiment, the transformation can be done using the rotation and translation term obtained using Equation (11) and Equation (12) respectively.

For example, using the method described in [6], the direction feature of the minutiae in the first partial minutiae template 301 can be transformed to the reference minutiae template 300 by simply adding the rotation angle calculated to the direction feature. Features such as the minutia type, distance and angle relationship between a minutia with respect to its neighboring minutiae as described in [6] need not be changed.

Thus, a new reference template is generated, which comprises the reference minutia and the transformed first minutiae, In a further step (step 411) it is determined, whether all partial images, i.e. all partial minutiae templates have been processed.

In case not all partial minutiae templates have been processed, a new iteration in step 404 is started with
  the new reference minutiae template as the reference minutiae template of the next iteration,
  the following unprocessed partial minutiae template as the first partial minutae template of the next iteration, In other words, the steps 404 to 410 are repeated until all minutia templates have been processed. It is to be noted that in the iteration process, the new reference template will serve as the respective reference template for the subsequent iteration.

In case, all partial minutiae templates have been processed, the total minutiae template is computed and stored (step 412) and the method is stopped (step 413).

Once the total minutiae template is stored, given an input fingerprint which minutia template has been obtained, the minutia template of the input fingerprint can be matched to that of the total minutiae template using a general fingerprint matching algorithm, such as described in [6].

Figure 5E:
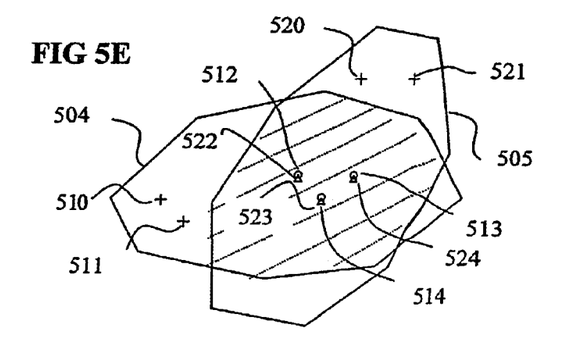

For further explanation, the synthesis of the fingerprint minutiae will again be described with reference to FIG. 5d and FIG. 5e:

Based on the matched minutiae, the first partial fingerprint image 505 is aligned to the reference partial fingerprint image 504.

That is, the parameters, which describe the minutiae of the first partial fingerprint image 505, are transformed from the coordinate space of the first partial fingerprint image 505 to the coordinate space of the reference partial fingerprint image 504, in which the parameters of each matched minutia pair are within the allowable tolerance.

The fingerprint boundary 501 in FIG. 5d is also transformed to the coordinate space of the reference partial fingerprint image 504. The final set of partial minutiae templates forming the total minutiae template consists of the minutiae designated by the symbol "+" 510, 511, 520, 521 (because minutiae "+" are not in the common region) and either minutiae designated by the symbol "o" 512, 513, 514 or minutiae designated by the symbol "A" 522, 523, 524 (because they are in the common region, i.e. the overlapping region) as shown as in FIG. 5e.

The method described above is an automated approach to perform the synthesis of minutiae templates. Of course manual approach can be performed as well by allowing the user to indicate the matched and unmatched minutiae and select from the unmatched minutiae those that need to be added onto the reference template.

In a further alternative embodiment of the invention, the transformation function may be determined using the principle of the general projection transformation according to the following equation:

$$\begin{bmatrix} x_{11} & x_{12} & \cdots & x_{1n} \\ x_{21} & x_{22} & \cdots & x_{2n} \\ x_{31} & x_{32} & \cdots & x_{3n} \end{bmatrix} = \begin{bmatrix} t_{11} & t_{12} & \cdots & t_{13} \\ t_{21} & t_{22} & \cdots & t_{23} \\ t_{31} & t_{32} & \cdots & 1 \end{bmatrix} \cdot \begin{bmatrix} x_{1i} & x_{2i} & \cdots & x_{ni} \\ y_{1i} & y_{2i} & \cdots & y_{ni} \\ 1 & 1 & \cdots & 1 \end{bmatrix}, \quad (14)$$

where $$x_{nr} = x_{1r}/x_{3n}, \text{ and} \quad (15)$$

$$y_{nr} = x_{2r}/x_{3n}, \quad (16)$$

which can be solved as:

$$\begin{bmatrix} x_{1i} & y_{1i} & 1 & 0 & 0 & 0 & -x_{1r}x_{1i} & -x_{1r}y_{1i} \\ 0 & 0 & 0 & x_{1i} & y_{1i} & 1 & -y_{1r}x_{1i} & -y_{1r}y_{1i} \\ x_{2i} & y_{2i} & 1 & 0 & 0 & 0 & -x_{2r}x_{2i} & -x_{2r}y_{2i} \\ 0 & 0 & 0 & x_{2i} & y_{2i} & 1 & -y_{2r}x_{2i} & -y_{2r}y_{2i} \\ \vdots & \vdots & \vdots & \vdots & \vdots & \vdots & \vdots & \vdots \\ x_{ni} & y_{ni} & 1 & 0 & 0 & 0 & -x_{nr}x_{ni} & -x_{nr}y_{ni} \\ 0 & 0 & 0 & x_{ni} & y_{ni} & 1 & -y_{nr}x_{ni} & -y_{nr}y_{ni} \end{bmatrix} \cdot \begin{bmatrix} t_{11} \\ t_{12} \\ t_{13} \\ t_{21} \\ t_{22} \\ t_{23} \\ t_{31} \\ t_{32} \end{bmatrix} = \begin{bmatrix} x_{1r} \\ x_{1r} \\ x_{2r} \\ y_{2r} \\ \vdots \\ x_{nr} \\ y_{nr} \end{bmatrix}, \quad (17)$$

with $t_{11}, \ldots, t_{32}$ can be solved with at least 4 matched minutiae.

Furthermore, according to a further alternative embodiment of the invention, the transformation function may also be determined using the principle of the quadratic topological transformation according to equations (18)–(20).

In this embodiment of the invention, it is assumed that the reference minutiae and the first minutiae are related by a quadratic function as:

$$\hat{x}_{kr} = t_1 x_{ki} + t_2 y_{ki} + t_3 + t_4 x_{ki}^2 + t_5 y_{ki}^2, \quad (18)$$

$$\hat{y}_{kr} = t_6 x_{ki} + t_7 y_{ki} + t_8 + t_9 x_{ki}^2 + t_{10} y_{ki}^2, \quad (19)$$

for k=1 to n.

The transformation parameters $t_1 \ldots t_{10}$ of the transformation function are determined using the following least square minimization objective function f:

$$f = \Sigma [(x_{kr} - \hat{x}_{kr})^2 + (y_{kr} - \hat{y}_{kr})^2]. \quad (20)$$

In this document, the following publications are cited:

[1] Xudong Jiang, Wei-Yun Yau and Wee Ser, Minutiae Extraction by Adaptive Tracing the Gray Level Ridge of the Fingerprint Image, International Conference on Image Processing, October 1999;
[2] Dario Maio and Davide Maltoni, Direct Gray-Scale Minutiae Detection in Fingerprints, IEEE Transactions on Pattern Analysis and Machine Intelligence, Vol. 19, No. 1, pp. 27–39, January 1997;
[3] U.S. Pat. No. 4,135,147;
[4] U.S. Pat. No. 4,646,352:
[5] U.S. Pat. No. 5,493,621;
[6] Xudong Jiang, Wei-Yun Yau and Wee Ser, Two-stage local and global fingerprint matching technique for automated fingerprint verification/identification, Singapore patent application No. 9903290-6;
[7] U.S. Pat. No. 5,524,161;
[8] G. H. Golub, C. F. van Loan, Matrix Computation, John Hopkins University Press, 1983.

What is claimed is:

1. A method for computer-based determination of a total minutiae template of a total fingerprint from a plurality of partial minutiae templates of partial fingerprints, comprising the following steps:
   a) selecting a reference minutiae template of a reference partial fingerprint from the plurality of partial minutiae templates, the reference minutiae template comprising reference minutiae,
   b) selecting a first partial minutiae template of a first partial fingerprint, which overlaps the reference minutiae template, the first partial minutiae template comprising first minutiae,
   c) matching the reference minutiae of the reference minutiae template with the first minutiae of the first partial minutiae template,
   d) determining a transformation function using the matching result, which transformation function describes the relation between the reference minutiae and the first minutiae,
   e) determining an overlapping region of the reference minutiae template and the first minutiae template based on boundary of effective fingerprint region in the reference partial fingerprint and transformed boundary of effective fingerprint region in the first partial fingerprint using the transformation function, and determining whether the first minutiae are located inside the overlapping region or outside of it,
   f) transforming the coordinates of the first minutiae, which are located outside the overlapping region, using the transformation function, thereby generating a new reference minutiae template, which comprises the reference minutia and the transformed first minutiae,
   g) selecting a second partial minutiae template, which overlaps the new reference minutiae template, the second partial minutiae template comprising second minutiae, and
   h) repeating steps c) to g) iteratively for all partial minutiae templates of the plurality of partial minutiae templates with
      the new reference minutiae template as the reference minutiae template of the next iteration,
      the second partial minutae template as the first partial minutae template of the next iteration,
      thereby generating the total minutiae template.

2. A method for computer-based determination of a total minutiae template according to claim 1,
   wherein the method further comprises the following steps:
      detecting a plurality of partial images of a fingerprint, and
      determining a partial minutiae template for each partial fingerprint image.

3. A method for computer-based determination of a total minutiae template according to claim 1,
   wherein a central partial minutiae template of the fingerprint is selected as the reference minutiae template of the first iteration.

4. A method for computer-based determination of a total minutiae template according to claim 1,
   wherein a mathematical description of the boundary of the effective fingerprint region is obtained using points located on the boundary of the effective fingerprint region.

5. A method for computer-based determination of a total minutiae template according to claim 1,
wherein step d) further comprises the following steps:
selecting a predetermined number of reference minutiae and first minutiae, which comply with a predefined criterion according to the matching result of step c),
forming a reference matrix comprising the selected reference minutiae,
forming a first matrix comprising the selected first minutiae,
determining the transformation function from the transformation relation between the reference matrix and the first matrix.

6. A method for computer-based determination of a total minutiae template according to claim 5,
wherein the transformation function between the reference matrix A and the first matrix B is given by the following formula:

$$A = T \cdot B,$$

wherein T is the transformation matrix.

7. A method for computer-based determination of a total minutiae template according to claim 6,
wherein the transformation matrix T is determined according to the following formula:

$$T = A \cdot B^{-1},$$

wherein $B^{-1}$ is the inverse of the first matrix B.

8. A method for computer-based determination of a total minutiae template according to claim 6,
wherein the transformation matrix T is determined using a least square approach.

9. A method for computer-based determination of a total minutiae template according to claim 6,
wherein the transformation matrix T is determined using a general projection transformation.

10. A method for computer-based determination of a total minutiae template according to claim 6,
wherein the transformation matrix T is determined using a quadratic topological transformation.

11. A method for computer-based determination of a total minutiae template according to claim 1,
wherein at least one further parameter of the first minutiae is transformed using the transformation function.

12. A method for computer-based determination of a total minutiae template according to claim 1,
wherein the orientation of the first minutiae is transformed, comprising the following steps:
determining an average rotation angle using the matched minutiae,
determining a rotation matrix using the average rotation angle,
transforming the orientation of the first minutiae using the rotation matrix.

13. A method for computer-based determination of a total minutiae template according to claim 12,
wherein the average rotation angle is determined according to the following formula:

$$\rho = \frac{1}{n} \sum_{k=1}^{n} (\rho_{kr} - \rho_{ki}),$$

wherein r is the minutia in the reference minutiae template and i is the first minutia.

14. A method for computer-based determination of a total minutiae template according to claim 13,
wherein the rotation matrix is determined according to the following formula:

$$R = \begin{bmatrix} \cos(\rho) & -\sin(\rho) \\ \sin(\rho) & \cos(\rho) \end{bmatrix}.$$

15. A computer-based device for determination of a total minutiae template of a total fingerprint from a plurality of partial minutiae templates of partial fingerprints, comprising a computer, which is arranged to execute the following steps:
a) selecting a reference minutiae template of a reference partial fingerprint from the plurality of partial minutiae templates, the reference minutiae template comprising reference minutiae,
b) selecting a first partial minutiae template of a first partial fingerprint, which overlaps the reference minutiae template, the first partial minutiae template comprising first minutiae,
c) matching the reference minutiae of the reference minutiae template with the first minutiae of the first partial minutiae template,
d) determining a transformation function using the matching result, which transformation function describes the relation between the reference minutiae and the first minutiae,
e) determining an overlapping region of the reference minutiae template and the first minutiae template based on boundary of effective fingerprint region in the reference partial fingerprint and transformed boundary of effective fingerprint region in the first partial fingerprint using the transformation function, and determining whether the first minutiae are located inside the overlapping region or outside of it,
f) transforming the coordinates of the first minutiae, which are located outside the overlapping region, using the transformation function, thereby generating a new reference minutiae template, which comprises the reference minutia and the transformed first minutiae,
g) selecting a second partial minutiae template, which overlaps the new reference minutiae template, the second partial minutiae template comprising second minutiae, and
h) repeating steps c) to g) iteratively for all partial minutiae templates of the plurality of partial minutiae templates with
the new reference minutiae template as the reference minutiae template of the next iteration,
the second partial minutae template as the first partial minutae template of the next iteration,
thereby generating the total minutiae template.

16. A computer readable medium, having a program recorded thereon, where the program makes the computer execute a procedure comprising the following steps for determination of a total minutiae template of a total fingerprint from a plurality of partial minutiae templates of partial fingerprints:
a) selecting a reference minutiae template of a reference partial fingerprint from the plurality of partial minutiae templates, the reference minutiae template comprising reference minutiae, b) selecting a first partial minutiae template of a first partial fingerprint, which overlaps the reference minutiae template, the first partial minutiae template comprising first minutiae, c) matching the reference minutiae of the reference minutiae template with the first minutiae of the first partial minutiae template, d) determining a transformation function using the matching result, which transformation function describes the relation between the reference minutiae and the first minutiae, e) determining an overlapping region of the reference minutiae template and the first minutiae template based on boundary of effective fingerprint region in the reference Partial fingerprint and transformed boundary of effective fingerprint region in the first partial fingerprint using the transformation function, and determining whether the first minutiae are located inside the overlapping region or outside of it, f) transforming the coordinates of the first minutiae, which are located outside the overlapping region, using the transformation function, thereby generating a new reference minutiae template, which comprises the reference minutia and the transformed first minutiae, g) selecting a second partial minutiae template, which overlaps the new reference minutiae template, the second partial minutiae template comprising second minutiae, and h) repeating steps c) to g) iteratively for all partial minutiae templates of the plurality of partial minutiae templates with
 the new reference minutiae template as the reference minutiae template of the next iteration,
 the second partial minutae template as the first partial minutae template of the next iteration, thereby generating the total minutiae template.

* * * * *